(12) United States Patent
Gaucher

(10) Patent No.: US 11,867,228 B2
(45) Date of Patent: Jan. 9, 2024

(54) THRUST BEARINGS

(71) Applicant: Ratier-Figeac SAS, Figeac (FR)

(72) Inventor: Mathieu Gaucher, Camburat (FR)

(73) Assignee: RATIER-FIGEAC SAS, Figfigeac (FR)

( * ) Notice: Subject to any disclaimer, the term of this patent is extended or adjusted under 35 U.S.C. 154(b) by 41 days.

(21) Appl. No.: 17/665,879

(22) Filed: Feb. 7, 2022

(65) Prior Publication Data

US 2022/0252107 A1 Aug. 11, 2022

(30) Foreign Application Priority Data

Feb. 8, 2021 (EP) .................................... 21305169

(51) Int. Cl.
*F16C 19/30* (2006.01)
(52) U.S. Cl.
CPC ..................... *F16C 19/30* (2013.01)
(58) Field of Classification Search
CPC ........ F16C 19/30; F16C 19/305; F16C 19/32; F16C 19/44
See application file for complete search history.

(56) References Cited

U.S. PATENT DOCUMENTS

| 2,704,646 A | 3/1955 | Vogel |
| 3,091,501 A | 5/1963 | Satrum |
| 4,120,542 A * | 10/1978 | Bhateja .................. F16C 19/30 384/622 |
| 7,134,794 B2 | 11/2006 | Obayashi |
| 2007/0031075 A1* | 2/2007 | Yamamoto .............. F16C 19/30 384/420 |

FOREIGN PATENT DOCUMENTS

| CN | 201991934 U | 9/2011 |
| CN | 206257162 U | 6/2017 |
| CN | 111981036 A | 11/2020 |
| DE | 102014209236 A1 | 11/2015 |
| EP | 1653095 A2 | 5/2006 |

(Continued)

OTHER PUBLICATIONS

Abstract for CN111981036, 2 Pages.
(Continued)

*Primary Examiner* — James Pilkington
(74) *Attorney, Agent, or Firm* — CANTOR COLBURN LLP

(57) ABSTRACT

A thrust bearing includes cylindrical rollers arranged circumferentially in a bearing race with their rotational axes pointing radially to the central axis of the thrust bearing and each having a contact surface extending around and lengthwise of the cylindrical roller. The rollers includes at least pairs of radially adjacent first rollers with a radially inner first roller of each pair arranged with its rotational axis in alignment with the rotational axis of a radially outer first roller of the pair. The rollers also includes second rollers with at least one such second roller being arranged between adjacent pairs of first rollers in the circumferential direction, the at least one second roller being offset in the radial direction relative to the radially outer first rollers between which it is circumferentially arranged.

10 Claims, 4 Drawing Sheets

(56) References Cited

FOREIGN PATENT DOCUMENTS

EP          1653095  A3    5/2006
JP      2006183733  A    7/2006

OTHER PUBLICATIONS

Abstract for CN206257162, 1 Page.
Abstract for DE102014209236A1, 1 Page.
Abstract for JP2006183733, 1 Page.
Abstract of CN201991934, 1 Page.
European Search Report for Application No. 21305169.1, dated Aug. 12, 2021, 9 pages.

* cited by examiner

THRUST BEARINGS

CROSS-REFERENCE TO RELATED APPLICATIONS

This application claims priority to European Patent Application No. 21305169.1 filed Feb. 8, 2021, the entire contents of which is incorporated herein by reference.

TECHNICAL FIELD

This disclosure relates to thrust bearings.

BACKGROUND

In a cylindrical roller thrust bearing, relative speed in the contact areas of the roller and the bearing race generates a sliding phenomenon. This phenomenon decreases linearly from the roller extremity to the middle of the roller, where there is no sliding because a small area in the middle of the roller undergoes real rolling behaviour. The parts of the contact areas subject to the sliding phenomenon wear out but the middle area does not. Therefore, in the case of a thrust bearing having a single row of rollers circumferentially extending around a rolling race, since wear is greater at the roller extremities compared to the middle of the roller, over time the roller and/or the race wear unevenly in the radial direction. In certain applications a peak shape is adopted by the race and/or the roller with the peak being located in circumferential alignment with the middle of the roller. This leads to increased contact pressure in this area and finally to local material spalling on the race and/or the roller.

The speed of the roller on the bearing race increases according to the diameter, so that the sliding phenomenon results in greater material wear when it occurs at larger diameters. In the case of plural circumferentially extending rows of rollers, material wear is higher on the race and/or the rollers in the outermost row.

FIG. 1 shows a schematic plan view of a known thrust bearing 100 with an outer row and an inner row of cylindrical rollers 91. The rollers are retained in an annular retainer 93 to be rotatable about their longitudinal central axes with these rotational axes pointing radially to the central axis A of the thrust bearing 100. Each roller 91 has a contact surface extending around and lengthwise of the roller. In this thrust bearing, the contact surfaces of each roller extend the length of the roller. The rollers 91 are arranged in pairs of radially (with respect to the central axis of the thrust bearing) adjacent rollers with a radially inner roller 91A of each pair arranged with its rotational axis in alignment with the rotational axis of a radially outer roller 91B of the pair. The rollers are received in bearing races (not shown) on each axial side of the thrust bearing, so that the bearing allows relative rotation of the axially opposite bearing races while transmitting axial loads.

Each outer roller 91B has a length (in the radial direction of the thrust bearing 100) L10, each inner first roller 91A has a length L11, which is the same L10.

Each outer roller 91B is in loose end to end contact with the inner roller 91A of the roller pair. The loose contact allows the outer and inner rollers to rotate independently, at different rotational speeds.

Only one quadrant of the thrust bearing is shown and the complete bearing extends over a complete circumference. In this example, the thrust bearing has thirty-two rollers in total, consisting of sixteen pairs.

The present disclosure aims to provide an improved thrust bearing comprising cylindrical rollers.

SUMMARY

According to one aspect of the present disclosure there is provided a thrust bearing comprising cylindrical rollers arranged circumferentially in a bearing race with their rotational axes pointing radially to the central axis of the thrust bearing and each having a contact surface extending around and lengthwise of the cylindrical roller, the cylindrical rollers comprising at least pairs of radially adjacent first rollers with a radially inner first roller of each pair arranged with its rotational axis in alignment with the rotational axis of a radially outer first roller of the pair, and the cylindrical rollers comprising second rollers with at least one such second roller being arranged between adjacent pairs of first rollers in the circumferential direction, the at least one second roller being offset in the radial direction relative to the radially outer first rollers between which it is circumferentially arranged, wherein the radial offset is such that a halfway line located halfway along the length of the contact surface of each radially outer first roller is in circumferential alignment with a quarter-way line located one quarter along the length of the contact surface of the at least one second roller from a lengthwise end of the contact surface thereof, within plus or minus 5% of the length of the contact surfaces of the radially outer first roller.

In an optional example of such a thrust bearing, a region is located radially between the contact surface of the radially inner first roller and the contact surface of the radially outer first roller of each of the circumferentially adjacent pairs of first rollers between which the second roller is arranged in the circumferential direction, and wherein a three-quarter line located three quarters along the length of the contact surface of the at least one second roller from the lengthwise end of said contact surface of the at least one second roller is in circumferential alignment with the regions of the circumferentially adjacent pairs of first rollers between which the at least one second roller is arranged in the circumferential direction, within plus or minus 5% of the length of the contact surface of the at least one second roller.

The radially inner first roller and the radially outer first roller of each pair of first rollers may optionally be supported to be contactable with each other at their lengthwise ends which are adjacent in the radial direction of the thrust bearing. The first rollers may be so supported by a retainer. The retainer may also support the second rollers.

One or more second rollers may optionally be arranged between the first rollers in the circumferential direction. In an example, only one second roller is arranged between adjacent pairs of first rollers in the circumferential direction.

In an optional example, the lengthwise end of the contact surface of the at least one second roller is a radially outer end of the contact surface. The second roller may then be radially inwardly offset relative to the outer first roller. In another example, the lengthwise end of the contact surface of the at least one second roller is a radially inner end of the contact surface. The second roller may then be radially outwardly offset relative to the outer first roller.

In an optional example, the contact surfaces of the first and second rollers have the same length.

An aspect of the present disclosure provides an actuator comprising a thrust bearing as disclosed herein. The actuator may be for adjusting an elevator on an aircraft.

An aspect of the present disclosure provides a method of operating a thrust bearing as disclosed herein, wherein the thrust bearing is located between first and second components and allows relative rotation of the first and second components.

The first and second components may be relatively rotated up to a maximum of 25 rpm or 20 rpm or 15 rpm.

An axial load transmitted by the thrust bearing may be less than or equal to 25 Tonnes or 20 Tonnes or 15 Tonnes.

DETAILED DESCRIPTION

Figure 2:
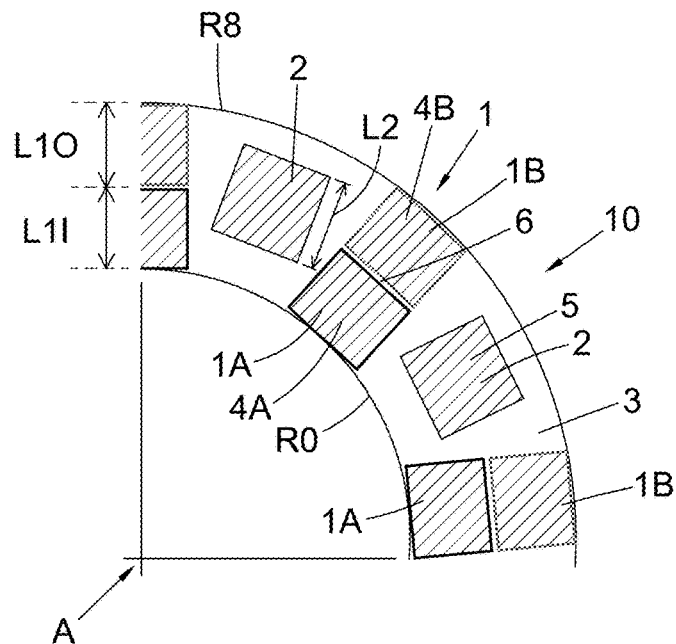
FIG. 2 shows a schematic plan view of one quadrant of a thrust bearing with an outer row and an inner row of cylindrical first rollers and a row of cylindrical second rollers, according to an embodiment of the present disclosure.

FIG. 2 shows a schematic plan view of an example of an embodiment of the present disclosure. The Figure shows one quadrant of a thrust bearing 10 with an outer row and an inner row of cylindrical first rollers 1 and a row of cylindrical second rollers 2. The rollers are retained in an annular retainer 3 to be rotatable about their longitudinal central axes with these rotational axes pointing radially to the central axis A of the thrust bearing 10. The first rollers 1 are arranged in pairs of radially (with respect to the central axis of the thrust bearing) adjacent first rollers with a radially inner first roller 1A of each pair arranged with its rotational axis in alignment with the rotational axis of a radially outer first roller 1B of the pair. A second roller 2 is arranged between adjacent pairs of first rollers in the circumferential direction (with respect to the central axis of the thrust bearing).

Each roller 1, 2 has a contact surface extending around and lengthwise of the roller. Inner first roller 1A has a contact surface 4A, outer first roller 1B has a contact surface 4B, and second roller has a contact surface 5. A region 6 is located radially between the contact surface 4A of the inner first roller 1A and the contact surface 4B of the outer first roller. In this example, it is assumed that the contact surfaces 4A, 4B, 5 of each roller extend the length of the roller.

The rollers are received in bearing races (not shown) on each axial side of the thrust bearing, so that the bearing allows relative rotation of the axially opposite bearing races while transmitting axial loads.

In use, for example in an actuator for adjusting an elevator on an aircraft, the thrust bearing is located between first and second components, allowing relative rotation between the components while transmitting axial loads.

Each outer first roller 1B has a length (in the radial direction of the thrust bearing 10) L10, each inner first roller 1A has a length L11, and each second roller 2 has a length L2. In this example, these lengths are the same, but this need not necessarily be the case. The outer first rollers 1B may have a different length from the inner first rollers 1A. The second rollers 2 may have a different length from the outer first rollers 1B. The second rollers 2 may have a different length from the inner first rollers 1A. It is convenient and economical for the rollers all to have the same length, as this requires only one type of roller to be manufactured. It is also convenient and economical for the contact surfaces of all the rollers to have the same length as each other.

In this example, each outer first roller 1B is in loose end to end contact with the inner first roller 1A of the first roller pair. The loose contact allows the outer and inner rollers to rotate independently, at different rotational speeds. They are so supported by the annular retainer 3. In other examples the rollers could have their ends spaced apart in the radial direction of the thrust bearing.

In this example, the length of each first roller 1, in the radial direction of the thrust bearing, is 10 mm. Each second roller 2 also has a length of 10 mm.

Only one quadrant of the thrust bearing is shown and the complete bearing extends over a complete circumference. In this example, the thrust bearing has thirty rollers in total, consisting of twenty first rollers 1 arranged in ten pairs and ten second rollers 2 each located between two circumferentially adjacent pairs of first rollers 1. However, this is just one example of how the principles of this disclosure may be applied, and other numbers of rollers and arrangements of rollers can be adopted while applying those principles.

This exemplary thrust bearing 10 is suitable for use in an actuator for adjusting an elevator on an aircraft, involving heavy loads, low rotational speeds and/or poor lubrication. For example, the maximum relative rotational speeds of two components at each end of the thrust bearing may be 15 rpm at a load of 15 Tonnes.

Figure 1:
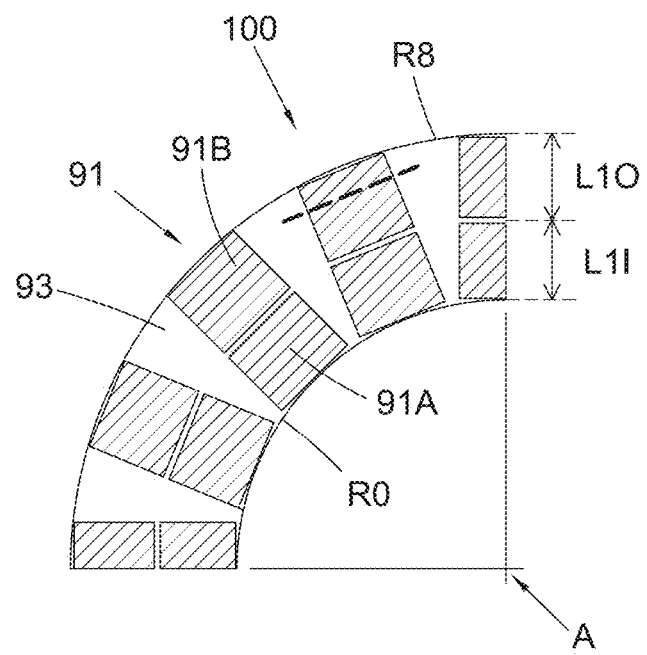
FIG. 1 shows a schematic plan view of one quadrant of a known thrust bearing with an outer row and an inner row of cylindrical rollers.
Figure 3:
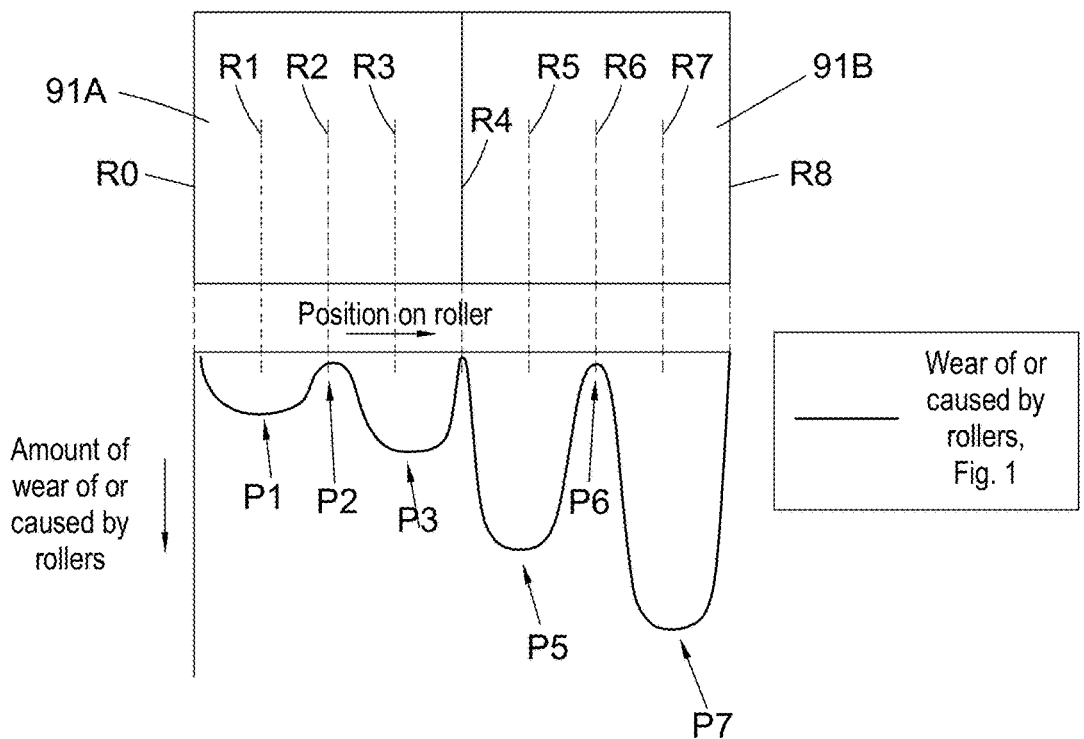
FIG. 3 shows a schematic view of a pair of cylindrical rollers of the known thrust bearing of FIG. 1, juxtaposed with a graph illustrating the wear characteristic of the rollers and/or the wear of a race caused by the rollers which roll in that race.

FIG. 3 shows a schematic view of a pair of first rollers 91 of the known thrust bearing 100 of FIG. 1, juxtaposed with a graph illustrating the wear characteristic of the rollers and/or caused by the rollers to the bearing races (not shown) on each axial side of the thrust bearing. The parallel vertical dotted lines R0-R8 represent the development of circumferentially extending lines in the thrust bearing 100, developed into straight lines to show the relative radial positions on the rollers 91, i.e. the positions on radii of the thrust bearing 100 extending through its central axis. Thus each line R0-R8 extends at a given radius from the thrust bearing central axis. Line R0 is at the inner end of the inner roller 91A, line R4 is at a radius where the outer end of the inner roller 91A and the inner end of the outer roller 91B meet, and line R8 is at the outer end of the outer roller 91B. Line R1 is located one quarter-way along the length of the inner roller 91A from the inner end of the roller, line R2 is located halfway along the length of the inner roller 91A from its inner end (also from its outer end), and line R3 is located three quarters-way along the length of the inner roller from its inner end. Line R5 is located one quarter-way along the length of the outer roller 91B from the inner end of the roller, line R6 is located halfway along the length of the outer roller 91B from its inner end (also from its outer end), and line R7 is located three quarters-way along the length of the outer roller 91B from its inner end.

The graph at the bottom of FIG. 3 illustrates the characteristic of the wear of the inner rollers 91A and the outer rollers 91B and/or the wear caused to the bearing races by those rollers of the known thrust bearing of FIG. 1 in use. The X axis shows the position along the length of the rollers corresponding to the rollers as shown in the top part of the Figure. The Y axis, extending downwardly, shows the amount of wear of the rollers and/or caused by the rollers to the bearing races on each axial side of the thrust bearing. The wear characteristic is shown by the solid line in the graph and shows the amount of wear of or caused by the rollers, i.e. the wear profile.

Where the solid line crosses line R6 where the outer roller 91B rolls and does not slide in the bearing races, this crossing point lies at the middle of the roller where there is very little wear of the roller or the bearing races caused by the contact surface of the roller. This is indicated as low wear portion P6, and is located longitudinally centrally of the outer roller 1B. In the case of the rollers, the low wear portion P6 extends round the roller, and in the case of the bearing races the low wear portion P6 extends round the circumference of the bearing races which extend circumferentially with respect to the thrust bearing.

On each side of the low wear portion P6, in the longitudinal direction of the roller 91B (the radial direction of the thrust bearing), there is a high wear portion. A high wear portion P7 is located longitudinally outwardly of the low wear portion P6, and a high wear portion P5 is located longitudinally inwardly of the low wear portion P6. The amount of wear of high wear portion P7 is greater than that of high wear portion P5, due to the fact that high wear portion P7 is at a radially greater distance from the central axis of the thrust bearing than high wear portion P5, and is therefore subject to higher speeds in use.

Over time, the profile illustrated is adopted, with the result that the axial load (with respect to the thrust bearing) concentrates at the low wear portion P6. The increased stress can lead to spalling of the roller or this portion of the bearing race.

Where one of these components, such as the bearing race, has most of the wear and thus has a peak shape, the spalling will tend to occur on the other component, such as the roller.

Regarding the wear profile of or caused by the inner roller 91A, this is also shown by the solid line. Where this crosses line R2 where the roller rolls and does not slide in the bearing races, this crossing point lies in the middle of the roller where there is very little wear of the roller or the bearing races caused by the contact surface of the inner roller. This is indicated as low wear portion P2, and is located longitudinally centrally of the inner roller 1A. In the case of the rollers, the low wear portion P2 extends round the roller, and in the case of the bearing races the low wear portion P2 extends round the circumference of the bearing races which extend circumferentially with respect to the thrust bearing.

On each side of the low wear portion P2, in the longitudinal direction of the roller 91A (the radial direction of the thrust bearing), there is a high wear portion. A high wear portion P3 is located longitudinally outwardly of the low wear portion P2, and a high wear portion P1 is located longitudinally inwardly of the low wear portion P2. The amount of wear of high wear portion P3 is greater than that of high wear portion P1, due to the fact that high wear portion P3 is at a radially greater distance from the central axis of the thrust bearing than high wear portion P1, and is therefore subject to higher speeds in use. Over time, the profile illustrated is adopted, with the result that the axial load (with respect to the thrust bearing) concentrates at the low wear portion P2. The increased stress can lead to spalling of the roller or this portion of the bearing race. However, due to the inner roller 91A being at a smaller radial distance from the central axis of the thrust bearing than the outer roller 91B, the speeds are lower than for the outer roller 91B, so the amount of wear is less than for the outer roller and the spalling problem may be less acute.

Figure 4:
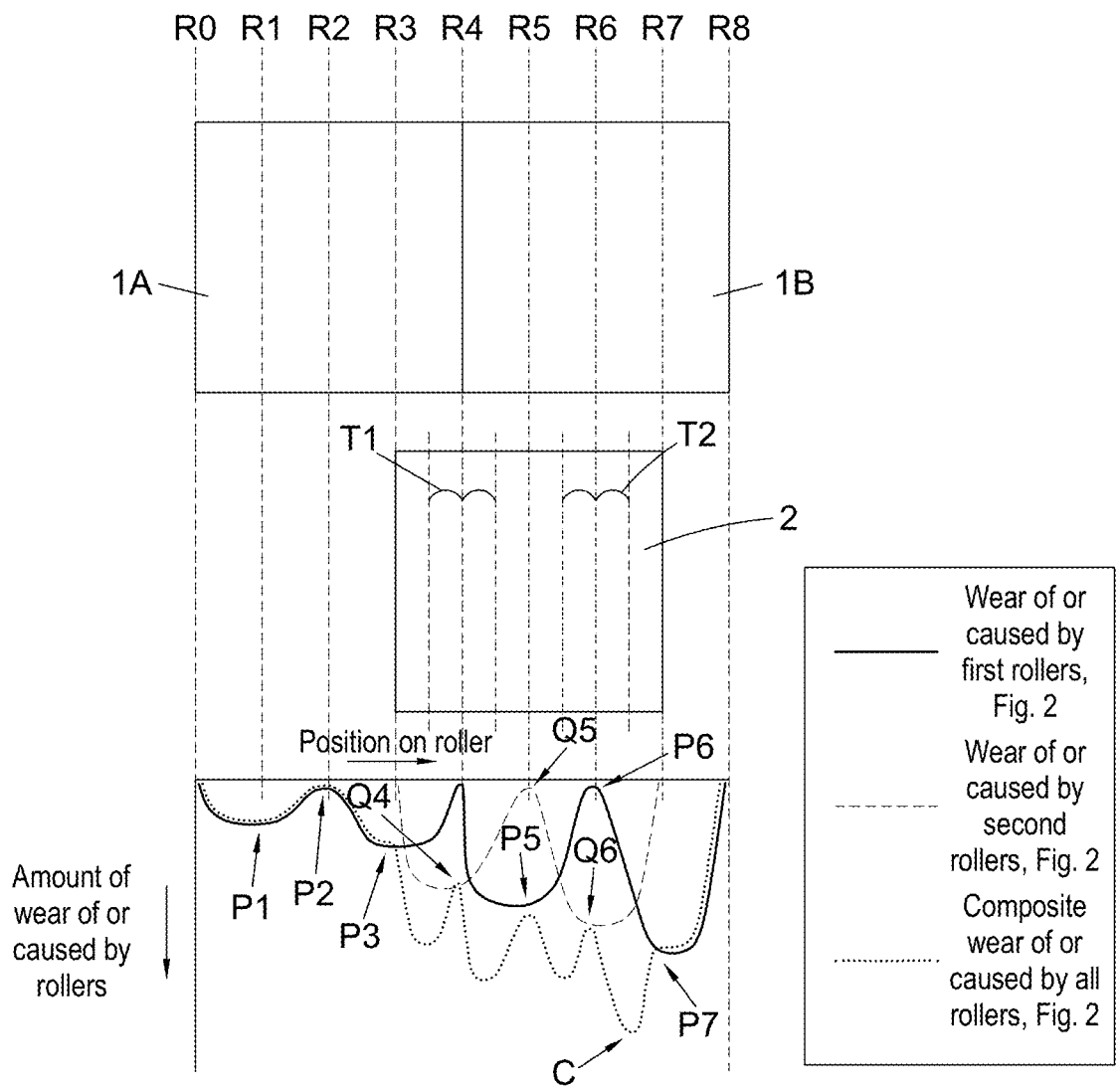
FIG. 4 shows a schematic view of a pair of first rollers and a second roller of the thrust bearing of FIG. 2, juxtaposed with a graph illustrating the wear characteristics of the rollers and/or the wear of a race caused by the rollers in that race.

The amount of wear of: high wear portion P7 is greater than that of high wear portion P5; high wear portion P5 is greater than that of high wear portion P3; and high wear portion P3 is greater than that of high wear portion P1. Thus high wear portion P7 has the greatest amount of wear FIG. 4 shows a schematic view of a pair of first rollers 1 and a second roller 2 of the thrust bearing 10 of FIG. 2, being an embodiment of the present disclosure, juxtaposed with a graph illustrating the three wear characteristics of or caused by the rollers. The parallel vertical dotted lines R0-R8 represent the development of circumferentially extending lines in the thrust bearing 10, developed into straight lines to show the relative radial positions of the rollers 1, 2, i.e. the positions on radii of the thrust bearing 10 extending through its central axis. Thus each line R0-R8 extends at a given radius from the thrust bearing central axis. Line R0 is at the inner end of the inner first roller 1A, line R4 is at a radius where the outer end of the inner first roller 1A and the inner end of the outer first roller 1B meet, and line R8 is at the outer end of the outer first roller 1B. Line R1 is located one quarter-way along the length of the inner first roller 1A from the inner end of the roller, line R2 is located halfway along the length of the inner first roller 1A from its inner end (also from its outer end), and line R3 is located three quarters-way along the length of the inner first roller from its inner end. Line R5 is located one quarter-way along the length of the outer first roller 1B from the inner end of the roller, line R6 is located halfway along the length of the outer first roller 1B from its inner end (also from its outer end), and line R7 is located three quarters-way along the length of the outer first roller from its inner end.

Second roller 2 is located circumferentially (with respect to a circumference around the thrust bearing central axis) adjacent to the pair of first rollers 1A, 1B. It is circumferentially spaced from the first rollers by the annular retainer (not shown in this figure). The second roller 2 is radially offset relative to the first rollers 1A, 1B. The offset is such that the halfway line R6 located halfway along the length of the outer first roller 1B, is in circumferential alignment with a line located one quarter-way along the length of the second roller 2 from its outer end, i.e. this quarter way line on the second roller 2 is also R6. Thus the second roller 2 is radially (relative to the thrust bearing central axis) inwardly offset from the outer first roller by one quarter-way of the length of the outer first roller. Because, in this example, the second roller 2 has the same length as the outer first roller 1B, the inner end of the second roller 2 is radially inwardly offset from the inner end of the outer first roller 1B by one quarter-way of the length of the outer first roller 1B.

The second roller 2 bridges the region 6 (see FIG. 2) between the contact surface 4B of the outer first roller 1B and the contact surface 4A of the inner first rollers 1A, in the radial direction of the thrust bearing.

The region 6 is located radially between the contact surface 4A of the radially inner first roller 1A and the contact surface 4B of the radially outer first roller 1B of the circumferentially adjacent pairs of first rollers 1A, 1B between which the second roller 2 is arranged in the circumferential direction, and a three-quarter line (on the line R4) located three quarters along the length of the contact surface 5 of the at least one second roller 2 from the radially inner lengthwise end of said contact surface 5 of the second roller 2 is in circumferential alignment with the regions 6 of the circumferentially adjacent pairs of first rollers 1A, 1B between which the second roller 2 is arranged in the circumferential direction.

In another example (not shown) the second roller 2 could instead be radially outwardly offset relative to the outer first roller 1B. In this case, the halfway line R6 of the outer first roller 1B would be coincident with a line one quarter-way way along the length of the second roller 2 from its inner end, in the radially outward direction with respect to the thrust bearing.

The graph at the bottom of FIG. 4 illustrates the wear characteristics of or caused by the rollers in use. The X axis shows the position along the length of the rollers corresponding to the rollers as shown in the top part of the Figure. The Y axis, extending downwardly, shows the amount of wear of or caused by the rollers to the bearing races on each axial side of the thrust bearing. The solid line on the graph shows the wear characteristic or profile of the first rollers 1A, 1B or caused to the bearing races by the first rollers 1A, 1B. The dashed line shows the wear characteristic or profile of the second rollers 2 or caused to the bearing races by the second rollers 2. The dotted line shows the total or composite amount of wear of or caused by the first rollers and the second rollers 2, i.e. the amount of wear of or caused by the first and second rollers, added together.

The wear profile of the solid line, of or caused by the first rollers 1A, 1B, is similar to the profile of the solid line shown in FIG. 3 relating to the known thrust bearing, but the amount of wear is less. This is because in the thrust bearing of FIG. 2 (an embodiment of this disclosure) there are ten pairs of first rollers 1A, 1B, whereas in the known thrust bearing shown in FIG. 1 there are sixteen pairs of rollers 91A, 91B. Consequently, for a given number of rotations of the thrust bearing, for the FIG. 2 thrust bearing the number of passes of the rollers 1A, 1B past a given radial line on the thrust bearing races is 10/16 of the number of passes of the rollers 91A, 91B of the FIG. 1 thrust bearing past a corresponding radial line.

Considering the solid line, where this crosses line R6 where the roller rolls and does not slide in the bearing races, this crossing point lies at the middle of the roller where there is very little wear of the contact surface of the roller or of the bearing race caused by the contact surface of the roller. This is indicated as low wear portion P6, and is located longitudinally centrally of the outer first roller 1B. In the case of the rollers, the low wear portion P6 extends round the roller, and in the case of the bearing races the low wear portion P6 extends round the circumference of the bearing races which extend circumferentially with respect to the thrust bearing.

On each side of the low wear portion P6, in the longitudinal direction of the roller 1B (the radial direction of the thrust bearing), there is a high wear portion. A high wear portion P7 is located longitudinally outwardly of the low wear portion P6, and a high wear portion P5 is located longitudinally inwardly of the low wear portion P6. The amount of wear of high wear portion P7 is greater than that of high wear portion P5, due to the fact that high wear portion P7 is at a radially greater distance from the central axis of the thrust bearing than high wear portion P5, and is therefore subject to higher speeds in use. Over time, the profile illustrated is adopted, with the result that the axial load (with respect to the thrust bearing) concentrates at the low wear portion P6. The increased stress can lead to spalling of this portion of the contact surface of the first outer roller 1B or the bearing race.

Regarding the wear profile of the inner first roller 1A, this is also shown by the solid line. Where this crosses line R2 where the roller rolls and does not slide in the bearing race, this crossing point lies at the middle of the roller where there is very little wear of the contact surface of the roller or of the bearing races caused by the contact surface of the roller. This is indicated as low wear portion P2, and is located longitudinally centrally of the inner roller 1A. In the case of the rollers, the low wear portion P2 extends round the roller, and in the case of the bearing races the low wear portion P2 extends round the circumference of the bearing races which extend circumferentially with respect to the thrust bearing.

On each side of the low wear portion P2, in the longitudinal direction of the roller 1A (the radial direction of the thrust bearing), there is a high wear portion. A high wear portion P3 is located longitudinally outwardly of the low wear portion P2, and a high wear portion P1 is located longitudinally inwardly of the low wear portion P2. The amount of wear of high wear portion P3 is greater than that of high wear portion P1, due to the fact that high wear portion P3 is at a radially greater distance from the central axis of the thrust bearing than high wear portion P1, and is therefore subject to higher speeds in use. Over time, the profile illustrated is adopted, with the result that the axial load (with respect to the thrust bearing) concentrates at the low wear portion P2. The increased stress can lead to spalling of the contact surface of the first inner roller 1A or the bearing race. However, due to the inner roller 1A being at a smaller radial distance from the central axis of the thrust bearing than the outer roller 1B, the speeds are lower than for the outer roller 1B, so the amount of wear is less than for the outer roller and the spalling problem may be less acute.

In the case of the thrust bearing shown in FIG. 2 (which is an embodiment of this disclosure), the amount of wear of: high wear portion P7 is greater than that of high wear portion P5; high wear portion P5 is greater than that of high wear portion P3; and high wear portion P3 is greater than that of high wear portion P1. Thus high wear portion P7 has the greatest amount of wear.

The wear characteristic or profile of the dashed line, caused by the second rollers 2, has the same general shape as that of the first outer rollers 1B, but with a reduced magnitude of maximum wear, in view of the second rollers 2 being at a location radially inward compared to the first outer rollers 1B.

Considering the dashed line which shows the wear profile caused by the second roller 2, where this crosses line R5 where the roller rolls and does not slide in the bearing race, this crossing point lies at the middle of the roller where there is very little wear of the contact surface of the second roller or caused by the contact surface of the second roller 2. This is indicated as low wear portion Q5, and is located longitudinally centrally of the second roller 2. In the case of the rollers, the low wear portion Q5 extends round the roller, and in the case of the bearing races the low wear portion Q5 extends round the circumference of the bearing races which extend circumferentially with respect to the thrust bearing.

On each side of the low wear portion Q5, in the longitudinal direction of the roller 2 (the radial direction of the thrust bearing), there is a high wear portion. A high wear portion Q6 is located longitudinally outwardly of the low wear portion Q5, and a high wear portion Q4 is located longitudinally inwardly of the low wear portion Q5. The amount of wear of high wear portion Q6 is greater than that of high wear portion Q4, due to the fact that high wear portion Q6 is at a radially greater distance from the central axis of the thrust bearing than high wear portion Q4, and is therefore subject to higher speeds in use.

The dotted line shows the amount of wear of or caused by the three rollers, as used in this example of the disclosure, added together i.e. the composite wear of or caused by all three rollers. The low wear portion P6 of the outer first roller 1B is in circumferential alignment with the high wear portion Q6 of the second roller, along line R6. As a result the peak shape in the material which would have formed at low wear portion P6 in the absence of an offset second roller 2 does not occur, because the material is worn by the presence of the second roller 2 and the high wear portion Q6 associated therewith.

A similar effect occurs elsewhere along the length of the second roller 2. The low wear portion Q5 of the second roller 2 is in circumferential alignment with the high wear portion P5 of the outer first roller 1B. As a result the peak shape of the material which would have formed at low wear portion Q5 in the absence of outer first roller 1B does not occur, because the material is worn by the presence of the outer first roller 1B and the high wear portion P5 associated therewith.

In view of the circumferential alignment of high and low wear portions between the first rollers on the one hand and the second roller on the other hand, there will be less load concentration caused by the wear and hence less tendency for spalling. General wear is reduced and the service life of the bearing is increased.

Figure 5:
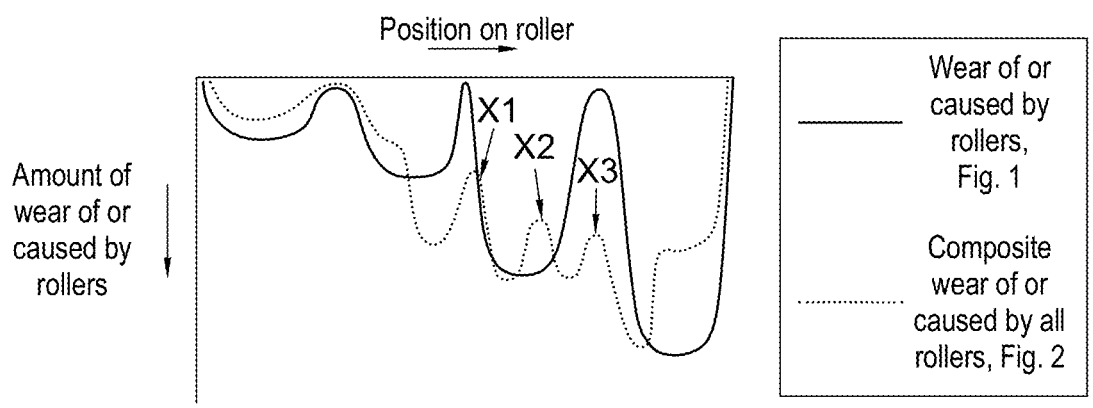
FIG. 5 shows the graph illustrating the wear characteristic shown in FIG. 3, and one of the characteristics shown in FIG. 4, for comparison purposes.

FIG. 5 shows the dotted line for the composite wear caused by the three rollers 1A, 1B and 2, as used in the example of this disclosure shown in FIG. 2, and also the solid line caused by the rollers 91A, 91B in the known thrust bearing shown in FIG. 1. It will be seen that the difference between adjacent peaks and troughs of the dotted line in less than the difference between adjacent peaks and troughs of the solid line. As a result, the tendency for spalling is reduced and the working life of the bearing is increased. In addition, in examples in which most of the wear occurs in the bearing races and not the rollers, each roller is in contact with plural peaks in the material of the bearing races, rather than a single peak at the middle of the roller. For example, in the case of the second roller 2, this will be in contact with three peaks namely X1, X2 and X3, as shown in FIG. 5.

In this example, all the rollers 1A, 1B and 2 have a length of 10 mm, and a diameter of 10 mm. The amount of wear of the high wear portion P7 is about 20 microns. These are just exemplary figures.

In this description, reference is made to the wear of the rollers and/or the wear caused by the rollers to the bearing races on each axial side of the thrust bearing. The amount of the wear depends on the radial position of roller and race contacting portions, the radial position being with respect to the axis of rotation of the thrust bearing. Very little, or no, wear occurs where there is pure rolling of the roller, and more wear occurs towards the roller ends where there is more slipping. The wear will occur in the roller and the races, and it may occur more in one of these than the other. The material of which the rollers and the races are made may affect the distribution of wear between rollers and race. In the examples of this disclosure, most of the wear occurs in the races.

In the examples of this disclosure described herein, the second roller is offset in the radial direction relative to the radially outer first rollers between which it is circumferentially arranged, wherein the radial offset is such that a halfway line located halfway along the length of the contact surface of each radially outer first roller is in circumferential alignment with a quarter-way line located one quarter along the length of the contact surface of the at least one second roller from a lengthwise end of the contact surface thereof. However a favourable reduction in material peaks is still achieved with some variation from exact alignment. Thus the radial offset may be such that the halfway line of each radially outer first roller is in circumferential alignment with the quarter-way line of the second roller, within plus or minus 5% of the length of the contact surfaces of the radially outer first roller.

It is also beneficial in this example that the second roller 2 bridges the region 6 between the outer first and inner first rollers 1B, 1A, in the radial direction of the thrust bearing. This circumferentially aligns the high wear portion Q4 of the second roller 2 with the ends of the outer and inner first rollers where low wear occurs, again allowing reduction in a peak in this location.

The region 6 extending radially from the contact surface of the radially inner first roller to the contact surface of the radially outer first roller of a pair of first rollers is in circumferential alignment with a first portion T1 (see FIG. 4) of the contact surface of the at least one second roller so as to be entirely overlapped by that first portion T1 when viewed in a circumferential direction. A halfway line (line R6) located halfway along the length of the contact surface of each radially outer first roller is in circumferential alignment with a second portion T2 of the contact surface of the at least one second roller, said second portion T2 extending radially outwardly beyond said halfway line. The combination of the positioning of the first and second portions T1 and T2 of the second roller 2 relative to the outer first roller 1B, with the second roller 2 being offset in a radially inward direction relative to the radially outer first rollers 1B between which it is circumferentially arranged, assists a reduction in material peaks.

Figure 6:
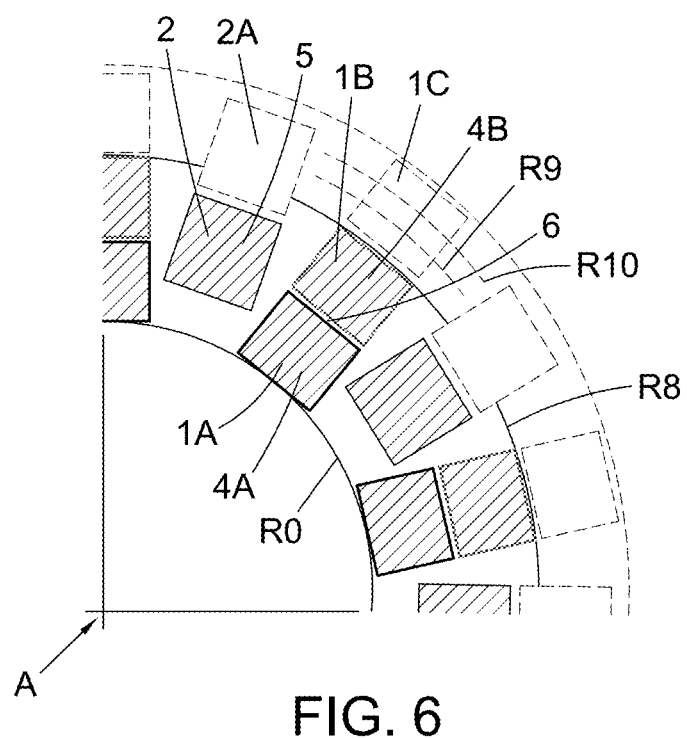
FIG. 6 shows a schematic plan view of one quadrant of a thrust bearing with three rows of cylindrical first rollers and two rows of cylindrical second rollers, according to another embodiment of the present disclosure.

FIG. 6 shows a view of one quadrant of a thrust bearing with three rows of cylindrical first rollers 1 and two rows of cylindrical second rollers 2, according to another embodiment of the present disclosure. Compared to the FIG. 2 example, the thrust bearing has for each pair of first rollers an additional first roller 1C, located radially outwardly of first roller 1B, shown in dotted lines, so that a set of three first rollers is provided. The thrust bearing also has an additional second roller 2A located radially outwardly of second roller 2, shown in dotted lines, so that a pair of second rollers is provided.

The additional second roller 2A is radially offset relative to the first rollers 1B, 1C. The offset is such that the halfway line R10 located halfway along the length of the additional first roller 1C, is in circumferential alignment with a line located one quarter-way along the length of the additional second roller 2A from its outer end, i.e. this quarter way line on the additional second roller 2A is also R10. Thus the additional second roller 2A is radially (relative to the thrust bearing central axis) inwardly offset from the additional first roller 1C by one quarter-way of the length of the additional first roller 1C.

Similar benefits in terms of axial load distribution and reduced overall wear can be achieved by the FIG. 6 example as in the case of the FIG. 2 example. The additional rollers mean that the thrust bearing can support higher axial loads.

One or more further additional rollers, radially outwardly of the first rollers and/or the second rollers, may be used in further examples, depending on the load to be supported and the available space.

In the FIG. 2 example, the single pairs of first rollers 1A, 1B form the at least pairs of first rollers. In the FIG. 6 example the pairs of first rollers 1A, 1B, plus additional first rollers 1C, form the at least pairs of first rollers.

In examples in which at least one additional first roller is provided for each pair of first rollers, the rotational axis or axes of at the least one additional first roller is in alignment with the rotational axes of the respective pair of first rollers.

What is claimed is:

1. A thrust bearing having a central axis, the thrust bearing comprising:
    cylindrical rollers arranged circumferentially in a bearing race with their rotational axes pointing radially to the central axis of the thrust bearing and each having a contact surface extending around and lengthwise of the cylindrical roller,
    wherein the cylindrical rollers comprise at least pairs of radially adjacent first rollers with a radially inner first roller of each pair arranged with its rotational axis in alignment with the rotational axis of a radially outer first roller of the pair,
    wherein the cylindrical rollers comprise second rollers with at least one such second roller being arranged between adjacent pairs of first rollers in the circumferential direction, the at least one second roller being offset in the radial direction relative to the radially outer first rollers between which it is circumferentially arranged, wherein the radial offset is such that a halfway line located halfway along the length of the contact surface of each radially outer first roller is in circumferential alignment with a quarter-way line located one quarter along the length of the contact surface of the at least one second roller from a radially outer lengthwise end of the contact surface thereof, wherein the circumferential alignment has a tolerance of plus or minus 5% of the length of the contact surfaces of the radially outer first rollers.

2. A thrust bearing as claimed in claim 1, wherein a region is located radially between the contact surface of the radially inner first roller and the contact surface of the radially outer first roller of each of the circumferentially adjacent pairs of first rollers between which the second roller is arranged in the circumferential direction, and wherein a three-quarter line located three quarters along the length of the contact surface of the at least one second roller from the radially outer lengthwise end of said contact surface of the at least one second roller is in circumferential alignment with the regions of the circumferentially adjacent pairs of first rollers between which the at least one second roller is arranged in the circumferential direction, wherein the circumferential alignment has a tolerance of plus or minus 5% of the length of the contact surface of the at least one second roller.

3. A thrust bearing as claimed in claim 1, wherein the radially inner first roller and the radially outer first roller of each pair of first rollers are contactable with each other at their lengthwise ends which are adjacent in the radial direction of the thrust bearing.

4. A thrust bearing as claimed in claim 1, wherein only one second roller is arranged between adjacent pairs of first rollers in the circumferential direction.

5. A thrust bearing as claimed in claim 1, wherein the contact surfaces of the first and second rollers have the same length.

6. An actuator comprising:
    a thrust bearing as claimed in claim 1.

7. An actuator for adjusting an elevator on an aircraft, comprising:
    a thrust bearing as claimed in claim 1.

8. A method of operating a thrust bearing as claimed in claim 1, comprising:
    providing the thrust bearing between a first component and a second component such that it allows relative rotation of the first component and the second component.

9. A method as claimed in claim 8, wherein said first component and second component are relatively rotated up to a maximum of 25 rpm or 20 rpm or 15 rpm.

10. A method as claimed in claim 8, wherein an axial load is transmitted by the thrust bearing, and wherein the axial load is less than or equal to 25 Tonnes or 20 Tonnes or 15 Tonnes.

* * * * *